No. 684,911. Patented Oct. 22, 1901.
J. COLLINS.
LOADING APPARATUS.
(Application filed Feb. 4, 1901.)
(No Model.) 2 Sheets—Sheet 1.
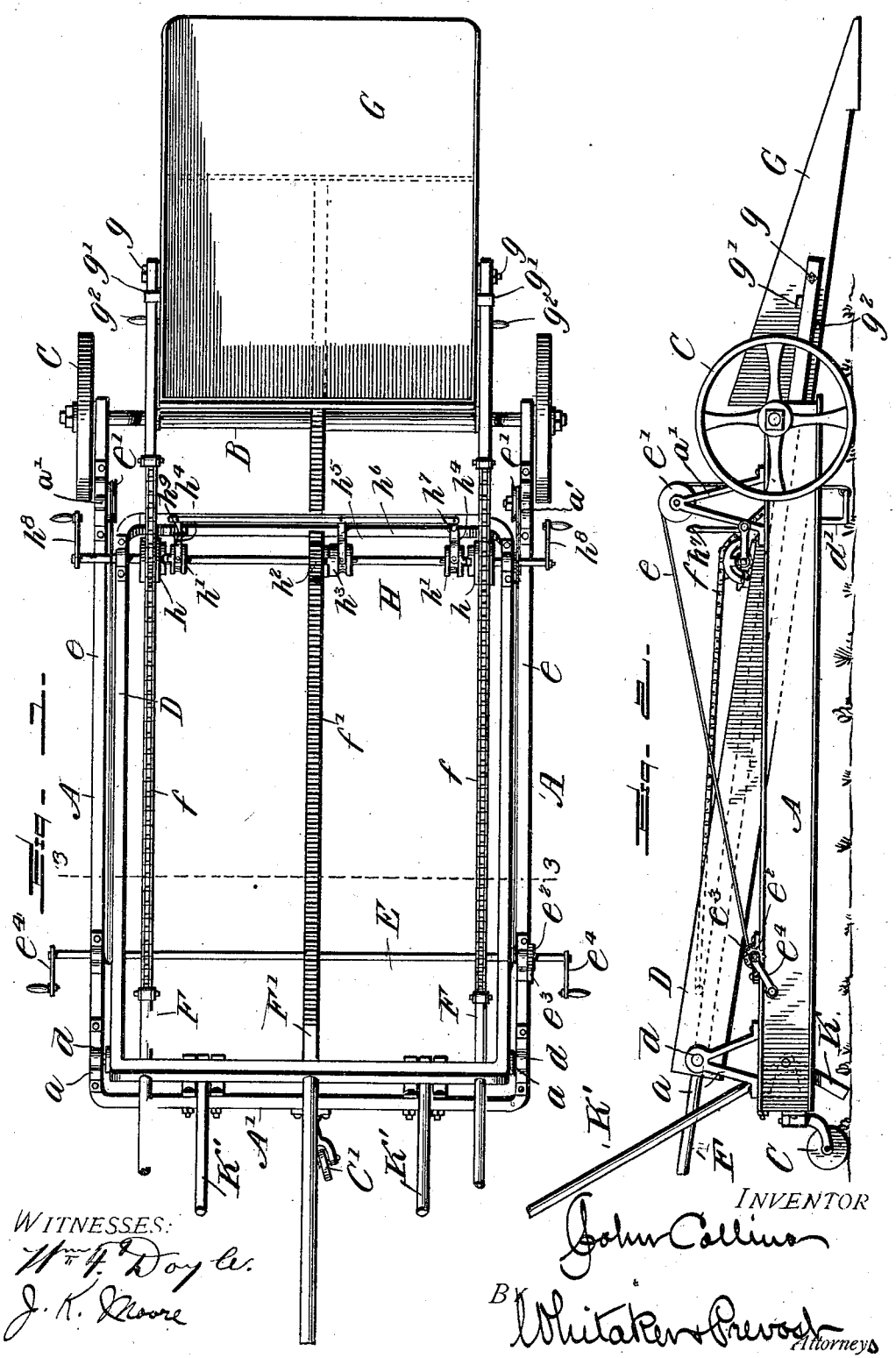
WITNESSES:
INVENTOR
John Collins
BY Whitaker + Prevost
Attorneys

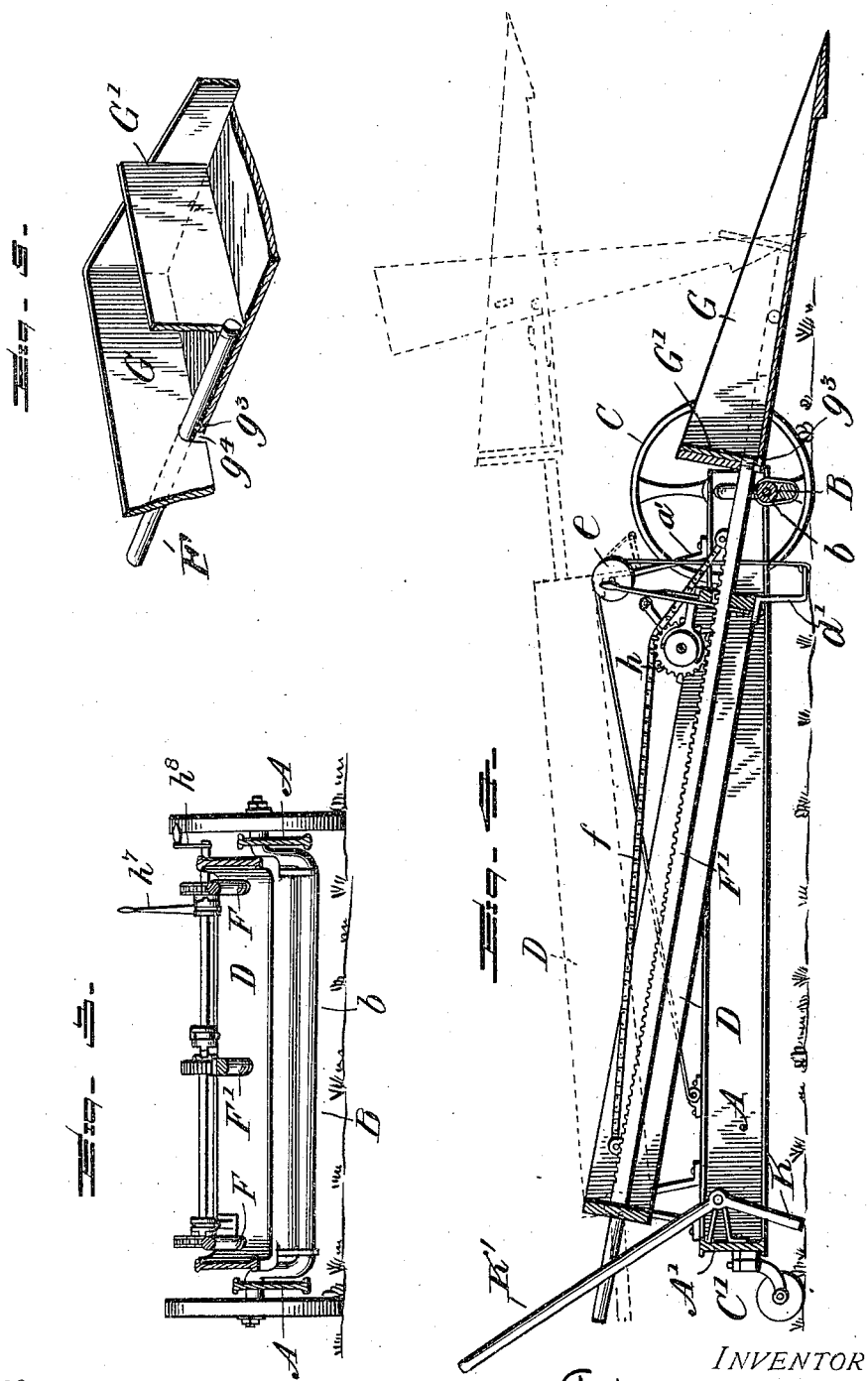

UNITED STATES PATENT OFFICE.

JOHN COLLINS, OF DAYTON, OHIO, ASSIGNOR OF ONE-HALF TO WASHINGTON FOGLESONG, OF DAYTON, OHIO.

LOADING APPARATUS.

SPECIFICATION forming part of Letters Patent No. 684,911, dated October 22, 1901.

Application filed February 4, 1901. Serial No. 46,007. (No model.)

*To all whom it may concern:*

Be it known that I, JOHN COLLINS, a citizen of the United States, residing at Dayton, in the county of Montgomery and State of Ohio, have invented certain new and useful Improvements in Loading Apparatus; and I do hereby declare the following to be a full, clear, and exact description of the invention, such as will enable others skilled in the art to which it appertains to make and use the same.

My invention is an improvement in loading apparatus; and it consists in the novel features hereinafter described, reference being had to the accompanying drawings, which illustrate one form in which I have contemplated embodying my invention, and said invention is fully disclosed in the following description and claims.

Referring to the said drawings, Figure 1 represents a top plan view of a machine or apparatus embodying my invention. Fig. 2 is a side view of the same. Fig. 3 is a transverse vertical sectional view on line 3 3 of Fig. 1. Fig. 4 is a central longitudinal sectional view. Fig. 5 is a detail view of a part of the shovel or scraper and sliding back plate.

The apparatus herein shown is designed particularly for removing coal or ore from low veins and loading it onto cars or trucks; but it will be apparent that it may be conveniently used for other purposes.

In the apparatus shown in the drawings, the main frame consists of two side bars A A, connected by a rear frame-bar A'. The front ends of the side bars are connected by a drop-axle B, on which are mounted the main supporting-wheels C C outside of the side bars A A, and the rear frame-bar will be provided with one or more caster-wheels C', one being shown located centrally of the said rear bar. Upon the main frame is mounted a rectangular frame D, having its rear end pivotally connected to the main frame. In this instance the rear end of frame D is provided on opposite sides with trunnions $d$ $d$, which engage bearings $a$ $a$, carried upon the main frame-bars A A. The forward end of the pivoted frame D is provided with ropes, chains, or other flexible connections $e$ $e$, preferably connected to bracket-arms $d'$ $d'$, secured to frame D and projecting below the same. These connections $e$ $e$ extend upward over idle pulleys $e'$ $e'$, mounted on brackets $a'$ $a'$, secured to the side bars A A, and thence rearwardly to a transverse winding-shaft or windlass E, mounted in bearings secured to the side bars A A and provided with a ratchet-wheel $e^2$ and detent or pawl $e^3$. The shaft E is provided, preferably, at each end with a handle $e^4$ or other operating device. At each side of the machine is a rod F, mounted to slide in guiding-bearings provided in the pivoted frame D. A scoop or shovel G is pivotally connected at $g$ $g$ with the forward ends of said rods F, the scoop G being provided with laterally-projecting lugs $g'$ $g'$, engaging normally the upper sides of said rods F F to prevent the scoop from dumping rearward. I prefer to provide the scoop G with removable pins $g^2$ $g^2$ or equivalent devices to engage the rods F F below the same to prevent the scoop from dumping forward unless it is desired to have it do so, when said pins will be removed by hand.

On the tilting frame D is mounted a shaft H, provided with a sprocket-wheel $h$ in line with each of the rods F, and each of said rods is provided with a sprocket-chain $f$, passing over one of said wheels $h$ and having its ends secured to the rod F. The pinions $h$ $h$ are loosely mounted on the shaft H and are adapted to be rigidly secured thereto by means of sliding clutch members $h'$ $h'$, connected to the shaft by splines.

F' represents a longitudinally-sliding bar mounted centrally in the pivoted frame D and provided at its forward end with an end plate G', which forms the dumping end wall of the scraper or shovel G and which is separate therefrom. In order to allow for the dumping of the scoop or shovel, the bottom plate of the latter will be provided at its rear end with a transverse slit or aperture $g^3$, through which the dumping end wall may pass when the scoop is dumped, and the rear end wall of the scoop is provided with a recess $g^4$ to accommodate the rod F', as shown in Fig. 5. The rod F' is provided with a rack $f'$, which is engaged by a pinion $h^2$, loosely mounted on the shaft H and adapted to be secured thereto by a sliding clutch member $h^3$, splined on the shaft.

$h^6$ represents a shifting bar having a longitudinal movement transversely of the machine. $h^4$ represents a yoke connected therewith and engaging the clutch member $h^3$. The clutch members $h'\,h'$ are also connected to the shifting bar $h^7$, so that they will be thrown out of operative position when the clutch member $h^3$ is thrown in, and vice versa. In this instance a yoke $h^4$ engages each of said clutch members $h'\,h'$, one of said yokes being rigidly secured to the shifting bar $h^6$, while the other is pivoted between its ends at $h^9$ to a stationary part of the frame and has its end loosely pivoted to the shifting bar. This arrangement secures the required operation of the clutch members $h'\,h'$ and $h^3$. The shifting bar is provided with a hand-lever $h^7$ for operating the same.

The operation of the apparatus is as follows: The machine being in the position shown in Fig. 2, with the frame D lowered, so as to bring the scoop close to the ground, the machine is run into the mine or to any other point where material is to be removed and is placed with the scoop in front of the material to be operated on. The shifting lever $h^7$ is then moved so as to clutch the sprocket-wheels $h\,h$ to shaft H, and thereby unclutch the pinion $h^3$. The operators then turn the shaft H by means of suitable handles $h^8$ or other operating devices, thereby moving the rods F F forward and forcing the scoop under a portion of the material, so as to fill the scoop. I prefer to provide means for holding the main frame against backward movement during this operation, and in this instance I have shown it provided at its rear end with a pair of pivoted drop-arms K K for engaging the ground to lock the frame and a pair of upwardly-extending pivoted arms K' K' for engaging the roof of the mine, if the apparatus is being used in a tunnel or mine. These arms K K' will be folded out of the way when not in use. The scoop or shovel being loaded, the shaft H will be turned in the opposite direction, so as to withdraw it and bring it back until it rests over and upon the drop-axle B, the upper face of which is provided with the roller or rollers $b$ to avoid friction. This brings the weight of the load upon the main wheels C C. The operators will now rotate shaft E by means of the handles $e^4\,e^4$ and raise the front end of the frame D and the chute, thus preventing the load from spilling. The machine is now pushed out of the mine or tunnel and to the place where the load is to be discharged into a car, truck, chute, or dump-pile, as the case may be. When in proper position, the shaft H is again turned and the scoop is run out until it is in proper position over the car or truck or chute to be dumped. The scoop can be dumped in either of two ways. If it is desired to force out the load without changing the position of the scoop, the operator shifts the lever $h^7$ so as to throw the clutches $h'\,h'$ out of and the clutch $h^3$ into engagement with pinion $h^2$. The shaft H is then rotated so as to push forward the rod F' and the dumping end board or plate G', (see Fig. 5 and the lower position in Fig. 4,) thereby discharging the load from the scoop. If it is desired to dump the scoop on its pivots, the end-board G' is left in its rearmost position and the pins $g^2$ are removed, when the scoop or shovel will turn on its pivots, as shown in the upper dotted position, Fig. 4, and discharge the load. The apparatus is then restored to its normal position and is ready to repeat the loading operation.

I do not desire to be limited to the exact details of construction herein shown and described, as slight variations may be made therefrom without departing from my invention.

What I claim, and desire to secure by Letters Patent, is—

1. The combination with the main frame, of longitudinally-movable guide-rods movably supported thereby, a scoop carried by said guide-rods, chains connected to said guide-rods, actuating chain-wheels engaging said chains to project and retract said scoop and guide-rods and operating devices for said chain, substantially as described.

2. The combination with the main frame, of a vertically-movable frame, pivotally connected to the main frame, longitudinally-movable guide-rods carried by said pivoted frame, a scoop secured to said guide-rods, chains connected to said guide-rods, a driving-shaft mounted on said pivoted frame, chain-wheels on said shaft engaging said chains, operating mechanism for said chain-wheels and mechanism for raising and lowering said pivoted frame, substantially as described.

3. The combination with the main frame, of a vertically-movable frame pivoted to said main frame, guide-rods carried by said pivoted frame, a scoop carried by said guide-rods, chains connected with said guide-rods, chain-wheels carried by said pivoted frame and engaging said chains, operating mechanism for said chain-wheels, a movable end-board for said scoop and operating devices for said movable end-board, substantially as described.

4. The combination with the main frame, of a pivotally-mounted scoop movably supported thereby, means for elevating and depressing said scoop, means for projecting and retracting said scoop, a movable end-board for said scoop, operating devices connected with said end-board, and detachable means for locking said scoop to prevent it from turning on its pivots, substantially as described.

5. The combination with the main frame and rotary supports therefor, of scoop-supporting devices pivotally connected with the main frame, a scoop pivotally connected to said supporting devices, a movable end-board for said scoop mechanism for raising and lowering said scoop, mechanism for projecting and retracting said scoop, operative mechanism connected with said end-board for discharging the contents of said scoop and detachable devices for preventing said scoop from turning on its pivots, substantially as described.

6. The combination with the main frame provided with supporting-wheels, and a supporting-roller located adjacent to one end of said frame, of a scoop carried by said main frame, and adapted when in its retracted position to be supported upon said roller, and means for projecting and retracting said scoop, substantially as described.

7. The combination with the main frame provided with supporting-wheels adjacent to one end of a scoop movably connected to said frame, and capable of being moved adjacent to said wheels, so that the weight of said scoop and contents will be borne by said wheels, of mechanism for projecting and retracting said scoop, and mechanism for raising and lowering said scoop, substantially as described.

8. The combination with the main frame, and supporting-wheels therefor, of rods movably mounted in guides, supported by said main frame, a scoop connected to said rods, a movable end-board for said scoop, a rod operatively connected therewith and mounted in guides carried by the frame, a shaft carried by said frame, operating-wheels loose on said shaft, and connected separately with said rods, and means for connecting said wheels with said shaft, substantially as described.

9. The combination with the main frame, and supporting-wheels therefor, of a frame pivoted to said main frame, mechanism for raising and lowering said frame, rods having a sliding engagement with said pivoted frame, a scoop connected to said rods, a movable end-board for said scoop, a rod connected therewith and having a sliding engagement with said pivoted frame, a shaft for operating said rods, wheels loosely mounted on said shaft and connected separately with said rods, a clutch on said shaft adjacent to each of said wheels and operating devices connected to all of said clutches for securing their simultaneous movement, arranged so that when the clutches for the wheels operating the scoop-holding rods are in gear, the clutch for the end-board-operating wheel will be out of gear and vice versa, substantially as described.

10. The combination with the main frame and supporting-wheels therefor, of a scoop movably supported by said main frame, mechanism for projecting and retracting said scoop, and arms pivoted to the main frame and adapted to be moved into engagement with the ground or with the top of a shaft to prevent the retrogression of said main frame, substantially as described.

In testimony whereof I affix my signature in the presence of two witnesses.

JOHN COLLINS.

Witnesses:
MELVIN CRAMER,
D. W. IDDINGS.